July 15, 1924.
M. A. DREES
CIRCULATING PUMP
Filed Nov. 2, 1922
1,501,758
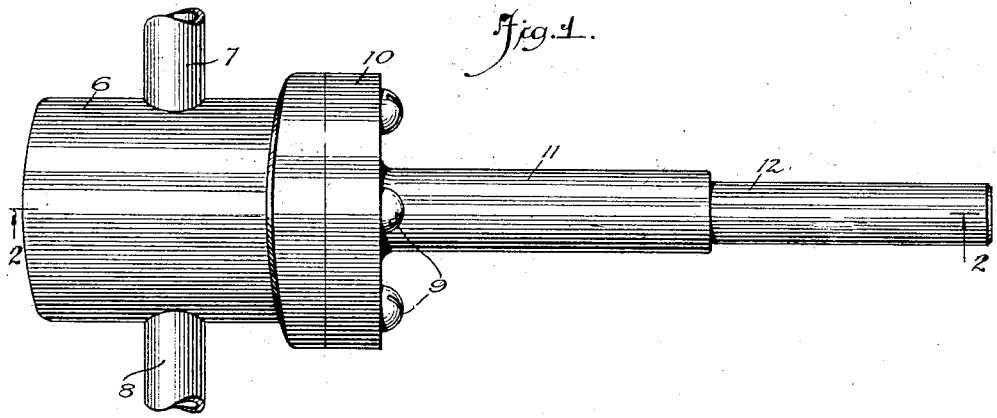
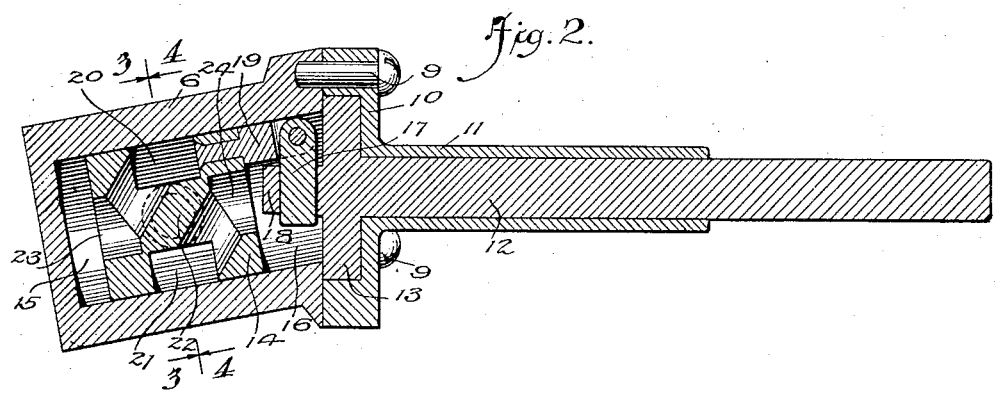
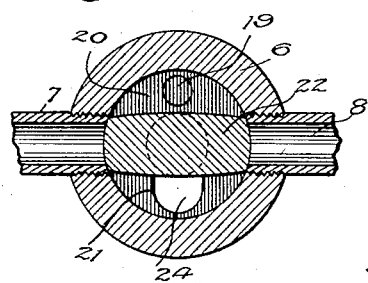
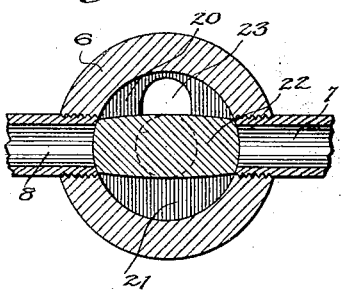
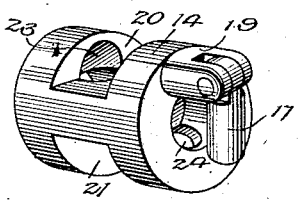
WITNESSES
INVENTOR
M. A. Drees
BY
ATTORNEYS Patented July 15, 1924.

1,501,758

UNITED STATES PATENT OFFICE.

MICHAEL A. DREES, OF MILWAUKEE, WISCONSIN.

CIRCULATING PUMP.

Application filed November 2, 1922. Serial No. 598,581.

*To all whom it may concern:*

Be it known that I, MICHAEL A. DREES, a citizen of the United States, and a resident of Milwaukee, in the county of Milwaukee and State of Wisconsin, have invented a new and Improved Circulating Pump, of which the following is a full, clear, and exact description.

This invention relates to improvements in pumps and has particular reference to a fluid circulating pump designed to be employed in connection with the lubricating systems of automobiles and other machines.

An object of the invention is to provide a pump which will be effective in circulating a lubricant, and in which the use of valves and springs is eliminated, thus increasing the durability and effectiveness of the pump.

Another object is to so construct and arrange the elements of the pump that as a lubricant or other fluid enters the pump the same is agitated by giving it a reciprocatory movement relative to the casing of the pump, which agitation places the fluid under pressure and results in a discharge thereof from the casing.

The above and other objects will appear more clearly from the following detail description, when taken in connection with the accompanying drawing, which illustrates a preferred embodiment of the inventive idea.

In the drawing—

Figure 1 is a top plan view of the pump constructed in accordance with the invention;

Figure 2 is a vertical longitudinal section on the line 2—2 of Figure 1;

Figure 3 is a transverse section through the pump casing and taken on the line 3—3 of Figure 2;

Figure 4 is a similar view taken on the line 4—4 of Figure 2; and

Figure 5 is a detail perspective view of the rotor employed in connection with the invention.

Although the pump is particularly designed for use in connection with the oiling system of motor vehicles, it is obvious that the same may be employed in various types of machines for the purpose of forcing a lubricant to various parts to be lubricated.

In the embodiment of the invention illustrated, the same is shown as comprising a cylindrical casing 6 open at one end and provided intermediate its ends with oppositely disposed inlet and outlet openings to which the pipes 7 and 8 are connected respectively. The open end of the casing 6 is preferably beveled so that the plane of said end will be disposed at an angle to the closed end of the casing for a purpose which will presently appear. Associated with the open end of the casing 6 and detachably secured thereto by means of screws 9 or other suitable fastening means is the collar 10 of a bearing member 11, which extends longitudinally of the casing and in which a driving shaft 12 is rotatably mounted, said shaft being designed to be driven from any suitable part of the engine of a motor vehicle, as is customary. The inner end of the shaft is provided with an enlargement or flange 13, which is engaged and surrounded by the collar 10 and which forms a closure for the open end of the casing 6 to prevent the escape of lubricant or other fluid from said casing. When the shaft and casing are thus positioned, the longitudinal axes thereof are inclined or angularly disposed with respect to each other by reason of the beveled formation of the open end of the casing 6.

Positioned within the casing 6 is a rotor 14 in the nature of a piston which is spaced from the ends of the casing to form the end chambers 15 and 16 and to which rotary movement is imparted through the medium of a universal joint connection including a pin 17 rotatably mounted in a transverse opening formed in the extension 18 of the shaft 12, which projects into the open end of the casing 6. A bifurcated member 19 is secured to the rotor 14 adjacent its periphery and has its bifurcated end pivotally connected to one extremity of the pin 17, whereby the rotor will be permitted to move in vertical and horizontal planes with respect to the longitudinal axis of the shaft 12. The rotor 14 is provided with oppositely disposed cut-out portions forming intermediate chambers 20 and 21 designed to register with the inlet and outlet openings of the casing to which the pipes 7 and 8 are connected as the rotor is operated. The portion 22 of the rotor between the inner walls or bottoms of the chambers 20 and 21 is of sufficient thickness to form closures for the inlet and outlet openings when the rotor is in the position shown in Figures 2, 3 and 4, and by reason of the position of the casing 6 relative to the shaft 12, it will be apparent that the longitudinal axis of the rotor 14 will also be disposed diagonally with respect to that of said shaft. It will also be obvious that due to the arrangement of the parts the side walls of the chambers 20 and 21 will be diagonally disposed with respect to the axis of rotation of the shaft. Through this construction it will be apparent that as the shaft 12 is rotated the chambers 20 and 21 in the rotor will describe a sinuous path with respect to the inlet and outlet openings in the casing and the side walls of said chambers will have the effect of a combined rotary and reciprocatory movement in the casing with respect to said openings to agitate a fluid, such as a lubricant, in the casing in such manner that as said fluid enters the casing through the inlet opening the same will first flow into one of the chambers which is momentarily aligned with said opening and from thence into one of the end chambers 15 or 16 through the communicating ports 23 and 24 connecting the chambers 20 and 21 with said chambers 15 and 16 respectively. As the rotor is operated and the chamber 20 comes into registration with the inlet opening the side wall of the chamber 20 adjacent the open end of the casing moves toward the inlet opening by reason of the mounting of the rotor with respect to the shaft 12 and during this movement has the effect of forcing the fluid flowing into the inlet opening and chamber 20 through port 23 and into the chamber 15, this flow being aided by the inclined relation of the port 23 with respect to said chambers. At the same time that the fluid is flowing into the chamber 15 and through the port 23 the chamber 21 is in registration with the outlet opening to which the pipe 8 is connected. At this time the port 24 is in a downwardly inclined position to aid in the flow of fluid from the chamber 16 into the chamber 21. With the latter chamber coming into registration with the outlet opening the sinuous path described by the wall of said chamber nearest the open end of the casing 6 at this time has the effect of moving said wall toward the closed end of the casing, thus forcing the fluid in the chamber 21 into the outlet opening. The chamber 21 next comes into registration with the inlet opening with the result that the lubricant flows into said chamber and through the port 24 and into the chamber 16, the side wall of the chamber 21 adjacent the closed end of the casing then moving toward the open end thereof and having the effect of exerting pressure upon the fluid to force the same through the port 24 and into the chamber 16. At the same time the chamber 20 comes into registration with the outlet opening and the fluid which had been taken into the chamber 15 is then discharged through said opening by the action of the rotor as the same revolves. Thus upon each revolution of the rotor the chambers 15 and 16 are filled with the fluid and discharged upon registration of the respective chambers 20 and 21 with the inlet and outlet openings in the casing.

What is claimed is:

In a pump, a casing having an open end and oppositely disposed inlet and exhaust ports, a shaft having its longitudinal axis arranged diagonally with respect to that of said casing and having a portion projecting into the open end of said casing, said shaft being formed with a flange for forming a closure for said open end, a bearing on said shaft having a collar surrounding said flange and to which said casing is secured, a rotor in said casing having rotary and longitudinal movements therein and forming chambers between the same, the closed end of the casing and said flange, said rotor being provided with oppositely disposed chambers intermediate the ends thereof, and ports in its ends communicating with the chambers formed by the rotor and casing, each of said ports also having communication with one of said intermediate chambers, and a pin pivotally connected to said rotor at one end thereof and engageable in the portion of said shaft projecting into said casing to impart movement of said shaft to said rotor.

MICHAEL A. DREES.